G. BERGMARK.
CLUTCH.
APPLICATION FILED OCT. 30, 1911.

1,039,351.

Patented Sept. 24, 1912.

2 SHEETS—SHEET 1.

Witnesses:
C. E. Wessels.
A. A. Olson.

Inventor:
Gustaf Bergmark,
By Joshua R. H. Potts
his Attorney.

G. BERGMARK.
CLUTCH.
APPLICATION FILED OCT. 30, 1911.

1,039,351.

Patented Sept. 24, 1912.

2 SHEETS—SHEET 2.

Witnesses:
E. E. Wessels.
A. A. Olson.

Inventor:
Gustaf Bergmark,
By Joshua R. H. Potts
his Attorney.

UNITED STATES PATENT OFFICE.

GUSTAF BERGMARK, OF CHICAGO, ILLINOIS.

CLUTCH.

1,039,351.   Specification of Letters Patent.   Patented Sept. 24, 1912.

Application filed October 30, 1911. Serial No. 657,425.

*To all whom it may concern:*

Be it known that I, GUSTAF BERGMARK, a subject of the King of Sweden, and a resident of the city of Chicago, county of Cook, and State of Illinois, have invented certain new and useful Improvements in Clutches, of which the following is a specification.

My invention relates to improvements in friction clutches and has for its object the production of a clutch of this character especially adapted for employment in automobile construction.

A further object is the production of a clutch as mentioned which will be of improved construction and efficient in operation.

Other objects will appear hereinafter.

With these objects in view my invention consists in a friction clutch characterized as above mentioned and in certain details of construction and arrangements of parts all as will be hereinafter fully described and more particularly pointed out in the appended claims.

Figure 1:
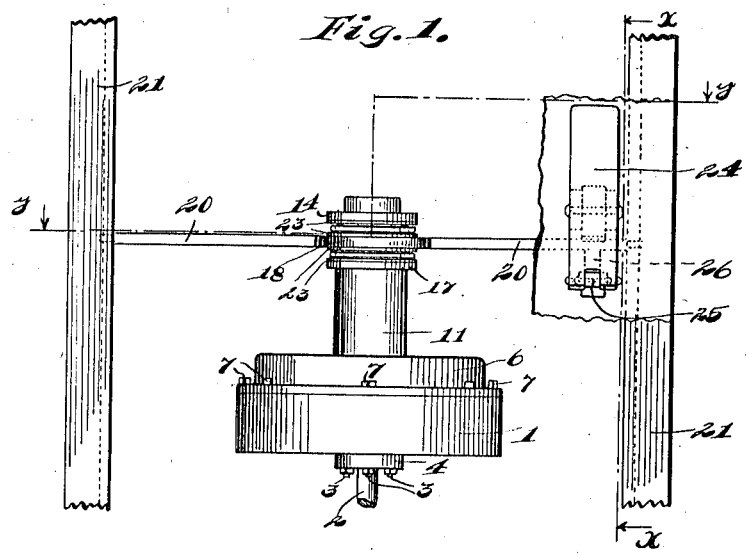
Figure 2:
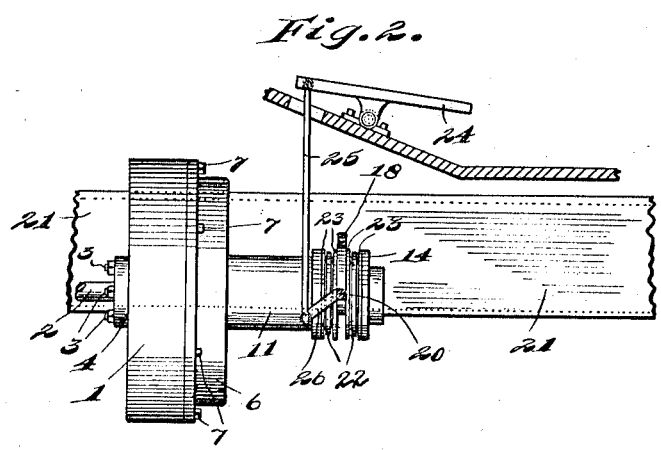
Figure 3:
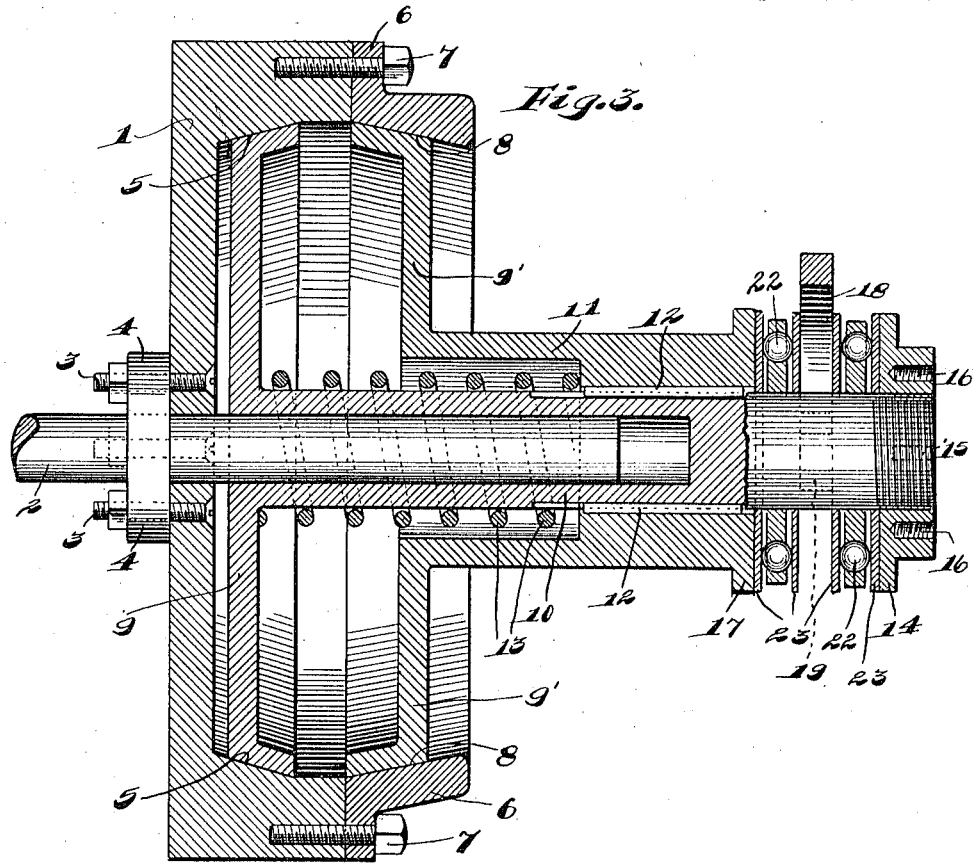
Figure 4:
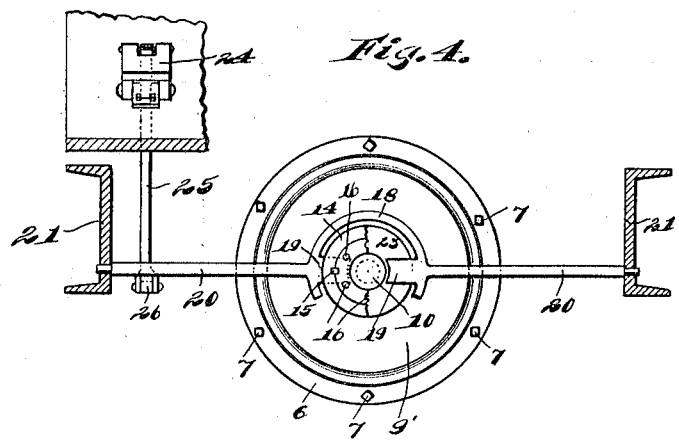

My invention will be more readily understood by reference to the accompanying drawings forming a part of this specification, and in which, Figure 1 is a top plan view of a clutch embodying my invention, the same being shown mounted in a sub-frame of an automobile, a fragment of said sub-frame being shown, Fig. 2 is a section taken on line *x—x* of Fig. 1, Fig. 3 is an enlarged central section of the clutch, and Fig. 4 is a section taken on line *y—y* of Fig. 1.

The preferred form of my construction as illustrated in the drawings comprises a relatively stationary clutch member 1 which is adapted when in operation to serve also in the capacity of a fly-wheel, the same being mounted upon the power shaft 2 of the engine and rigidly secured thereto by means of screws 3 which engage a circumferential collar 4 formed integral with said shaft. Said member 1 is of hollow construction, the same being formed at its inner side with an annular conical friction surface 5. Arranged upon one side of the member 1 is a ring 6 rigidly secured in position thereon by means of bolts 7. Formed upon the inner side of the ring 6 is a conical friction surface 8 which is inclined opposite to the surface 5, said surfaces 5 and 8 being of substantially equal diameter. Mounted within the clutch member 1 is a relatively movable clutch member 9, the periphery thereof being conically formed for engagement with the friction surface 5 of said member 1. The clutch member 9 is formed with an elongated hub 10 which is loosely mounted upon the adjacent end portion of the shaft 2, a running fit being constituted between the adjacent surfaces of said hub and shaft. Arranged within the ring 6 is a second relatively movable clutch member 9' of dimensions equal substantially to those of the clutch member 9, the conical periphery of the former being inclined opposite to that of the latter for engagement of the friction surface 8 of the ring 6. The clutch member 9' is also provided with an elongated hub 11 which is splined to the hub 10, 12 indicating the keys which are included in this connection. Arranged upon the hub 10 is a helical compression spring 13, the same being so arranged as to be adapted normally to force the clutch members 9 and 9' away from each other and into engagement with the friction surfaces 5 and 8 of the relatively stationary clutch member. The arrangement is such however, as will be observed, that disengagement of the clutch members 9 and 9' with the surfaces 5 and 8 is effected by moving said clutch members inwardly or toward each other.

Threaded upon the outer end of the hub 10 is a flange 14, the same being fixed against rotation thereon by means of keys 15. Provided in the outer side of the flange 14 is a plurality of tapped holes 16 which afford means for connection of the universal joint which usually is interposed at this point in the transmission of the automobile. Formed upon the corresponding end of the hub 11 is an integral circumferential flange 17. Arranged centrally between the flanges 14 and 17 above the hub 10 is a yoke 18 substantially semi-circular in formation. Formed at the terminals of said yoke are inwardly extending diametric projections 19 disposed directly between said flanges 14 and 17, the inner end portions of said projections being preferably rectangular in cross section as shown in Fig. 3. Projecting from the yoke 18 coaxially with the projections 19 are shanks 20 the outer extremities of which are rockingly mounted in the opposing bars 21 of the sub or other frame of the automobile. Interposed between the projections 19 of said yoke and the flanges 14 and 17 are ball thrust bearings 22, annular bearing plates 23 being interposed between the contacting portions of said bearings and said projections 19 and flanges 14 and 17. The arrangement is such that when the clutch members 9 and 9' are in operative position that is in engagement with the surfaces 5 and 8, the opposite sides of the projections 19, with the yoke 18 disposed as shown, will be disposed in close proximity with the inner sides of the innermost of the plates 23; and so that upon oscillation of said yoke, opposite edges or corners of said projections will engage against said bearing plates 23 serving to force the same apart and consequently to move the clutch members 9 and 9' toward each other to inoperative position. Manual oscillation of the yoke 18 as mentioned is effected through the medium of a pedal 24 which is arranged in operative proximity with the foot of the driver when the latter is in operating position, one end of said pedal being connected by means of a link 25 with a rocker-arm 26 secured to and projecting from one of the shanks 20 of said yoke. With this construction then the clutch members 9 and 9' will normally, under the influence of the spring 13, be forced into and held in operative position, that is in engagement with the surfaces 5 and 8. In order to effect inward movement of said clutch members in order to release the same it is only required to depress the rearward end of the pedal 24. With a construction as set forth, it will be seen that all of the energy exerted upon the pedal will be utilized to operate the movable clutch members since both abutments which are engaged by the projections 19 are arranged to utilize the force exerted thereon in moving the clutch members operatively connected therewith.

While I have illustrated and described the preferred form for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having described my invention what I claim as new and desire to secure by Letters Patent is:

1. In a spring pressed double cone clutch, flanges connected to the cones; an oscillatory yoke arranged for coöperation with said flanges; and diametric projections on said yoke disposed in the axis of oscillation of said yoke and positioned between said flanges, said projections being adapted, when said yoke is rocked, to move said flanges to actuate said cones, substantially as described.

2. In a spring pressed double cone clutch, flanges connected to the cones; an oscillatory substantially semicircular yoke arranged for coöperation with said flanges; and diametric projections on said yoke disposed in the axis of oscillation of said yoke and positioned between said flanges, said projections being adapted, when said yoke is rocked, to move said flanges to actuate said cones, substantially as described.

3. In a spring pressed double cone clutch, flanges connected to the cones; an oscillatory yoke arranged for coöperation with said flanges; diametric projections on said yoke disposed in the axis of oscillation of said yoke and positioned between said flanges, said projections being adapted, when said yoke is rocked, to move said flanges to actuate said cones; and means for manually oscillating said yoke, substantially as described.

4. In a spring pressed double cone clutch, flanges connected to the cones; an oscillatory substantially semicircular yoke arranged for coöperation with said flanges; diametric projections on said yoke disposed in the axis of oscillation of said yoke and positioned between said flanges, said projections being adapted, when said yoke is rocked, to move said flanges to actuate said cones; and means for manually oscillating said yoke, substantially as described.

In testimony whereof I have signed my name to this specification in the presence of two subscribing witnesses.

GUSTAF BERGMARK.

Witnesses:
 HELEN F. LILLIS,
 JOSHUA R. H. POTTS.